Patented Mar. 5, 1935

1,993,029

UNITED STATES PATENT OFFICE 1,993,029

SYNTHETIC RESIN AND METHOD OF PRODUCING

Ernest G. Peterson, Wilmington, Del., assignor to Hercules Powder Company, Wilmington, Del., a corporation of Delaware No Drawing. Application April 22, 1933, Serial No. 667,505

15 Claims. (Cl. 260—8)

This invention relates to a synthetic resin and method for its production.

The synthetic resins in accordance with this invention will be prepared in accordance with the method embodying this invention by reacting an alcohol with a resinous complex, or reaction product, formed by reacting terpinene, maleic anhydride or maleic acid in equivalent amount, and a compound containing the abietyl radical. The synthetic resin in accordance with this invention will comprise the product of such reaction.

The synthetic resins in accordance with this invention will have varying characteristics depending upon the precise procedure followed and the characteristics of the resinous complex used in its production, but generally will be adaptable as an ingredient for use in lacquers and varnishes. The synthetic resins will, in accordance with this invention, be generally compatible with nitrocellulose in widely varying proportions and likewise with the usual well known lacquer ingredients, as gums, resins, plasticizers, etc., etc. Further, various of the resins produced with the use of a polyhydric alcohol will be found to be heat reactive and to become infusible on heat treatment thus lending themselves in combination with fillers and the like to the production of molded objects.

The resinous complex, or reaction product for use in producing the synthetic resin in accordance with this invention may be produced, as more fully disclosed in the application for United States Letters Patent filed by me, Ernest G. Peterson, Serial No. 600,051, filed March 19, 1932, by reacting terpinene, which may be readily derived from terpenes, as pinene, dipentene, alpha terpineol, etc., by treatment with sulphuric acid, with maleic anhydride, or an equivalent amount of maleic acid, and a compound containing the abietyl radical as, for example, abietic acid, wood or gum rosin, an ester of abietic acid as methyl abietate, ethyl abietate, ester gum, etc., etc. The reaction may be carried out with the reagents in widely varying proportions and under varying conditions all as is fully disclosed in my said application Serial No. 600,051, filed March 19, 1932.

In producing the synthetic resin in accordance with this invention any desired alcohol may be used. Thus the alcohol may be either a polyhydric alcohol or a monohydric alcohol, and either low or high boiling. As illustrative, for example, ethyl, methyl, butyl, benzyl, fenchyl, etc., alcohols, borneol, glycerol, a glycol, etc., etc. may be used. A mixture of alcohols, such as a monohydric and a polyhydric alcohol, may be employed in the esterification. In such a case the esterification may be partially carried out first with the monohydric alcohol, followed by further esterification with the polyhydric alcohol, or vice versa.

In carrying out the method in accordance with this invention there is no necessity for the use of any particular form or type of apparatus. The reagents may be reacted in widely varying proportions depending more or less upon the characteristics desired for the product, and the reaction may be carried out under widely varying conditions as, for example, of pressure, temperature, etc.

Generally speaking the reaction will be carried out under atmospheric pressure, except that in the case of low boiling alcohols the use of superatmospheric pressure, say, for example, within the range 100 to 400 lbs. per sq. inch will be preferable. The reaction may be carried out at any suitable temperature, however, since the application of heat will facilitate the reaction it will preferably be carried out at a temperature, say, for example, within the range 75 to 250° C.

If desired a catalyst may be used to facilitate the reaction and as such any suitable esterification catalyst as, for example, sulphuric acid, paratoluene sulphonic acid, zinc chloride, etc., may be used. A catalyst may be used in any desired amount, but will preferably be used in an amount within say, for example, the range 1 to 10% by weight.

As illustrative of the practical adaptation of the method in accordance with this invention, using a monohydric alcohol, for the production of a synthetic resin embodying this invention, for example, a suitable resinous complex, a reaction product may be prepared by heating at about 200° C., for about three hours, at atmospheric pressure, 165 parts of abietic acid, 98 parts of maleic anhydride and 85 parts of alpha-terpinene, (parts by weight) and on completion of the reaction reducing the pressure to say about 15 mm. mercury to distill off any unreacted maleic anhydride and inert ingredients associated with the alpha-terpinene.

The resinous complex or reaction product as described and having a direct acid number of about 250 and a saponification value of about 400, is then reacted in the amount of 200 parts, by weight, with 400 parts of methyl alcohol in the presence of 50 parts of concentrated sulphuric acid which acts as a catalyst. The reaction is carried out by heating under a reflux for about 50 hours. The reaction mass is then washed with water to remove the sulphuric acid and excess alcohol and the reaction product finally dried in any suitable manner, as, for example, by heating sufficiently to drive off the water.

The reaction product, produced as above described, will be found to be a soft semi-solid resin soluble in most organic solvents, such as acetone, methyl or ethyl alcohol, ethyl acetate, benzene, turpentine, etc., etc. The resin will be compatible with nitrocellulose in all desired proportions and will be a valuable ingredient in nitrocellulose compositions in that it will exert a plasticizing effect on nitrocellulose.

As illustrative of the production of a synthetic resin in accordance with this invention, using a polyhydric alcohol, for example, 100 parts by weight of the terpinene-maleic anhydride-abietic acid resinous complex, or reaction product, described above, and 58 parts of glycerol are heated under atmospheric pressure at a temperature of about 230–240° C. for about 6 hours, and excess glycerol distilled off under reduced pressure. The resultant resin will have an acid value of about 40 and a melting point (drop method) of approximately 100° C. The resin will be found to be highly desirable for use as an ingredient in nitrocellulose lacquers and in varnishes.

As further illustrative of the production of a synthetic resin in accordance with this invention, using benzyl alcohol, for example, 100 parts by weight of the terpinene-maleic anhydride-abietic acid resinous complex, or reaction product, and 150 parts of benzyl alcohol are heated under reflux at a temperature of about 200° C. for about 50 hours and excess benzyl alcohol distilled off under reduced pressure. The synthetic resin so produced is a very soft solid and is undistillable. It is soluble in the usual well known organic solvents and will be found desirable for use as a plasticizer in nitrocellulose lacquers.

It will be understood that the synthetic resin in accordance with my invention comprises broadly the reaction product of an alcohol and a resinous complex or reaction product formed, under any conditions, by the reaction of terpinene, maleic anhydride and a compound containing the abietyl radical. In accordance with the method embodying my invention the synthetic resin may be formed with the use of resinous complex, or reaction product, described, and an alcohol in any proportions and under any operable conditions, with or without the use of a catalyst.

It will be further understood that the synthetic resin in accordance with my invention is contemplated by me as adapted variously for various uses as in forming molded objects, in lacquers and in varnishes, it being understood that the synthetic resins are variously adaptable for use with the numerous ingredients heretofore used in plastics, lacquers and varnishes, and that variously they are capable of plasticizing nitrocellulose.

This application is a continuation in part of the application filed by me March 19, 1932, Serial No. 600,051.

What I claim and desire to protect by Letters Patent is:

1. A synthetic resin comprising a reaction product of an alcohol and an acidic composition comprising a reaction product of the reaction of terpinene, maleic anhydride and a compound containing the abietyl radical and of a character such that the abietyl radical is available for reaction.

2. A synthetic resin comprising a reaction product of an alcohol and an acidic composition comprising a reaction product of the reaction of terpinene, maleic anhydride and abietic acid.

3. A synthetic resin comprising a reaction product of a polyhydric alcohol and an acidic composition comprising a reaction product of the reaction of terpinene, maleic anhydride and a compound containing the abietyl radical and of a character such that the abietyl radical is available for reaction.

4. A synthetic resin comprising a reaction product of a polyhydric alcohol and an acidic composition comprising a reaction product of the reaction of terpinene, maleic anhydride and rosin.

5. A synthetic resin comprising a reaction product of a monohydric alcohol and an acidic composition comprising a reaction product of the reaction of terpinene, maleic anhydride and a compound containing the abietyl radical and of a character such that the abietyl radical is available for reaction.

6. A synthetic resin comprising a reaction product of a monohydric alcohol and an acidic composition comprising a reaction product of the reaction of terpinene, maleic anhydride and abietic acid.

7. The method for producing a synthetic resin which includes reacting terpinene, maleic anhydride and a compound containing the abietyl radical and of a character such that the abietyl radical is available for reaction, and then reacting the product of said reaction with an alcohol.

8. The method for producing a synthetic resin which includes reacting terpinene, maleic anhydride and abietic acid and then reacting the product of said reaction with an alcohol.

9. A synthetic resin comprising a reaction product of glycerol and an acidic composition comprising a reaction product of the reaction of terpinene, maleic anhydride and a compound containing the abietyl radical.

10. A synthetic resin comprising a reaction product of an aliphatic glycol and an acidic composition comprising a reaction product of the reaction of terpinene, maleic anhydride and a compound containing the abietyl radical.

11. A synthetic resin comprising a reaction product of an alcohol and an acidic composition comprising a reaction product of the reaction of terpinene, maleic anhydride and an abietic acid ester.

12. A coating composition comprising a reaction product of an alcohol and an acidic composition formed from terpinene, maleic anhydride and a compound containing the abietyl radical, and a solvent.

13. A coating composition comprising a reaction product of an alcohol and an acidic composition formed from terpinene, maleic anhydride and a compound containing the abietyl radical, a lacquer ingredient and a solvent.

14. A coating composition comprising a reaction product of an alcohol and an acidic composition formed from terpinene, maleic anhydride and a compound containing the abietyl radical, a varnish ingredient and a solvent.

15. The method for producing a synthetic resin which includes reacting terpinene, maleic anhydride and a compound containing the abietyl radical and of a character such that the abietyl radical is available for reaction, and then reacting the product of said reaction with low-boiling alcohol under superatmospheric pressure.

ERNEST G. PETERSON.